(12) United States Patent
Park et al.

(10) Patent No.: US 10,412,313 B2
(45) Date of Patent: Sep. 10, 2019

(54) APPARATUS FOR DRIVING A BLADE OF A CAMERA

(71) Applicant: JAHWA electronics Co., Ltd., Chungcheongbuk-do (KR)

(72) Inventors: Chang Wook Park, Gyeonggi-do (KR); In Soo Kim, Gyeonggi-do (KR); Hee Seung Kim, Seoul (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 22 days.

(21) Appl. No.: 15/860,971

(22) Filed: Jan. 3, 2018

(65) Prior Publication Data

US 2018/0213137 A1    Jul. 26, 2018

(30) Foreign Application Priority Data

Jan. 26, 2017    (KR) .......................... 10-2017-0012618

(51) Int. Cl.

| | |
|---|---|
| *H04N 5/235* | (2006.01) |
| *H04N 5/238* | (2006.01) |
| *G02B 7/04* | (2006.01) |
| *H04N 5/225* | (2006.01) |
| *G02B 7/08* | (2006.01) |
| *G02B 5/00* | (2006.01) |
| *H04N 5/232* | (2006.01) |
| *G02B 27/64* | (2006.01) |

(52) U.S. Cl.
CPC ............. *H04N 5/238* (2013.01); *G02B 5/005* (2013.01); *G02B 7/04* (2013.01); *G02B 7/08* (2013.01); *H04N 5/2254* (2013.01); *H04N 5/23287* (2013.01); *G02B 27/646* (2013.01)

(58) Field of Classification Search
CPC ................................ H04N 5/238; G02B 5/005
USPC ......................................................... 348/362
See application file for complete search history.

(56) References Cited

U.S. PATENT DOCUMENTS

| | | | | |
|---|---|---|---|---|
| 2002/0037169 A1* | 3/2002 | Yaginuma | ................ | G03B 9/00 396/458 |
| 2005/0286889 A1* | 12/2005 | Kihara | ..................... | G03B 9/10 396/463 |

(Continued)

FOREIGN PATENT DOCUMENTS

| | | |
|---|---|---|
| JP | H10-260451 A | 9/1998 |
| JP | 2006-337780 A | 12/2006 |

(Continued)

OTHER PUBLICATIONS

International Search Report dated Feb. 26, 2018 in corresponding International Application No. PCT/KR2017/013321; 7 pgs.

(Continued)

*Primary Examiner* — Usman A Khan
(74) *Attorney, Agent, or Firm* — Maier & Maier, PLLC

(57) ABSTRACT

An apparatus for driving an iris of a camera, which includes first and second magnets provided at different locations; a blade having an opening through which light is introduced, the blade being configured to adjust the amount of light introduced to a lens by means of physical movement; a driving unit configured to perform the physical movement of the blade; and a blade yoke made of a magnetic material and provided to the blade to generate an attractive force to the first or second magnets according to a location of the blade.

3 Claims, 4 Drawing Sheets

(56) References Cited

U.S. PATENT DOCUMENTS

| | | | | |
|---|---|---|---|---|
| 2007/0201866 A1* | 8/2007 | Kihara | ............... | G03B 9/18 |
| | | | | 396/468 |
| 2011/0176053 A1* | 7/2011 | Knoedgen | ............ | G03B 9/10 |
| | | | | 348/367 |
| 2014/0010526 A1* | 1/2014 | Takahashi | ............ | G03B 9/42 |
| | | | | 396/469 |
| 2017/0324892 A1* | 11/2017 | Kim | ............ | H04N 5/238 |
| 2017/0351161 A1* | 12/2017 | Hayashi | ............ | G03B 9/36 |

FOREIGN PATENT DOCUMENTS

| | | |
|---|---|---|
| JP | 2007-010943 A | 1/2007 |
| KR | 2006-0051456 A | 5/2006 |
| KR | 10-2009-0012497 A | 2/2009 |
| KR | 10-2010-0075716 A | 7/2010 |
| KR | 10-2011-0026337 A | 3/2011 |
| KR | 10-2016-0020768 A | 2/2016 |
| KR | 101700771 B1 | 1/2017 |

OTHER PUBLICATIONS

Korean Office Action dated Apr. 11, 2017 in corresponding Korean Application No. 1020170012618; 7 pgs.

Office Action dated Dec. 11, 2018 in corresponding Korean Application No. 10-2017-0012618; 8 pages.

* cited by examiner

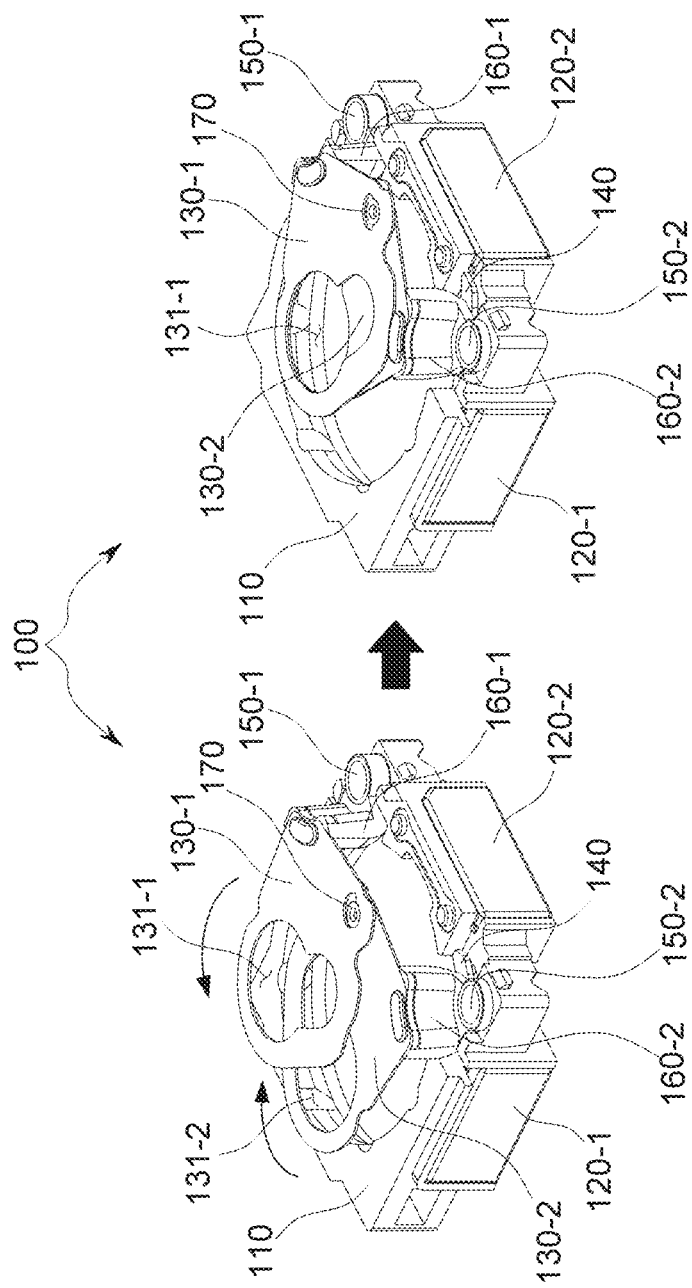

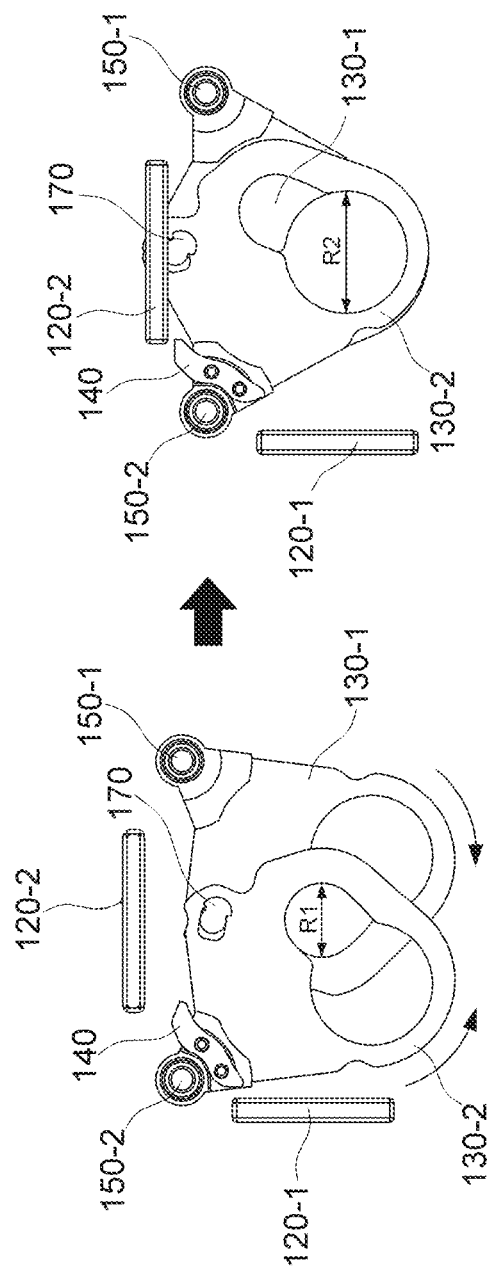

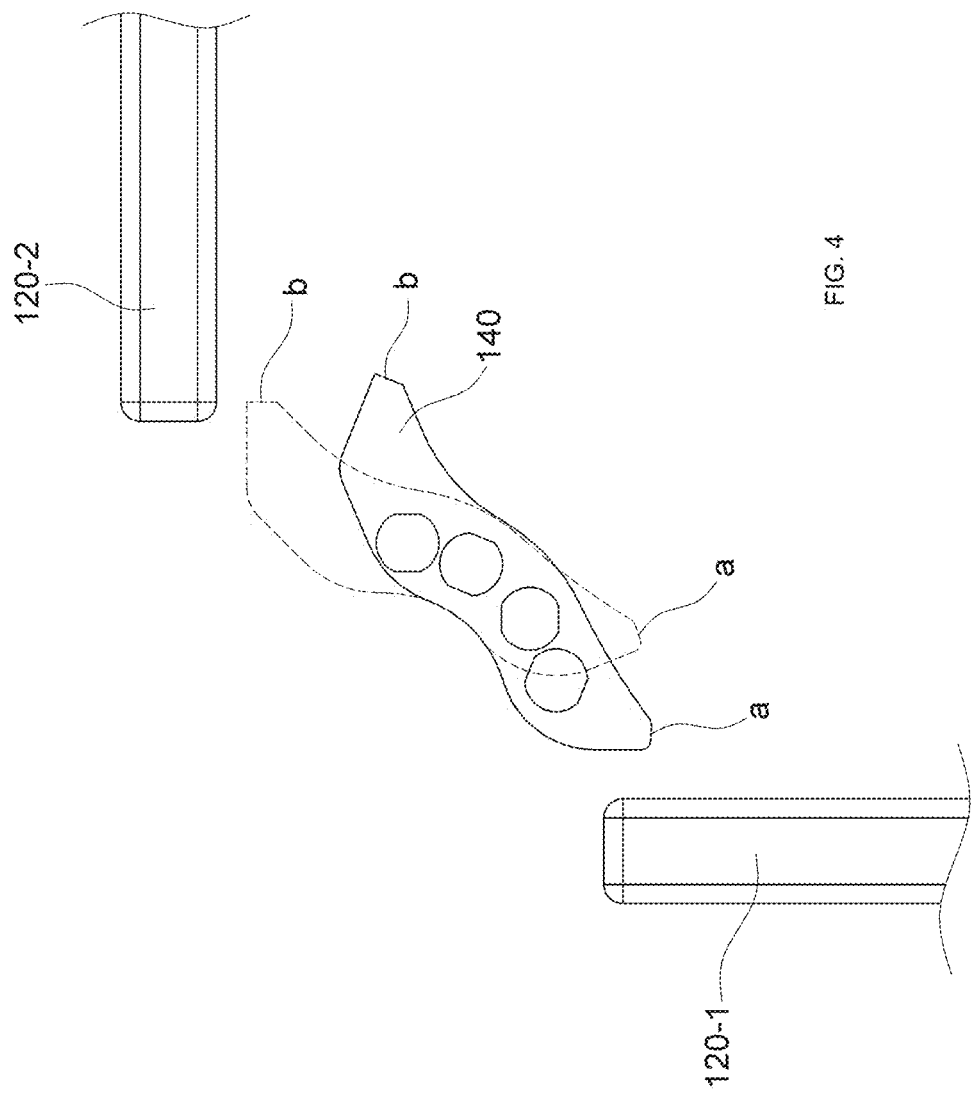

APPARATUS FOR DRIVING A BLADE OF A CAMERA

TECHNICAL FIELD

The present disclosure relates to an apparatus for driving an iris, and more particularly, to an apparatus for driving an iris, to which a structure for allowing a blade of an iris to maintain an accurate location by using a magnetic force of a magnet is applied.

BACKGROUND

In accordance with the development of hardware technology, user environment and the like, various and complex functions are integrally implemented in a portable terminal such as a smart phone in addition to basic functions for communication.

A typical example is a camera module in which various functions such as autofocus (AF), optical image stabilization (OIS) are implemented. In recent years, voice recognition, fingerprint recognition, iris recognition or the like is also mounted to a mobile terminal for certification or security.

A camera module or device mounted to a portable terminal or the like includes a diaphragm for controlling the amount of light introduced into a lens. The diaphragm may have various structures according to embodiments, but generally one or more blades (IRIS) having a wing shape are provided to open or close so that the amount of light introduced into the lens is adjusted, which is also called an iris since it functions similar to the iris of the eye.

An iris driving device adjusts the amount of light introduced into the lens by controlling a blade located at the front of the lens to be moved to a specific location by user selection or automated setup. At this time, the blade moving to a specific location should maintain a predetermined location until another control signal is input.

In the existing technique, complicated physical structures using one or more elastic bodies such as a torsion spring, a plurality of engaged gears or the like are applied to maintain the position of the blade moved to a specific location.

However, the conventional structure makes the device complex and large and thus may not be easily mounted to a portable terminal which essentially demands a small and light design. In addition, due to the complex structure, the conventional structure may malfunction frequently. Moreover, since the physically engaged structure may be deviated or damaged just by a small impact, a failure may easily occur.

In addition, in case of a camera module in which functions such as auto focus (AF) or auto image stabilization (OIS) are implemented, an additional physical structure independent from the structure for implementing these functions should be provided, and thus it is considerably difficult to combine this structure harmoniously with the structure for the AF operation or the OIS operation.

Further, in case of a portable terminal in which various functions are combined, it is needed that each function consumes a low power. However, in the conventional structure, the complexly combined or engaged structure should be physically driven as a whole, which is however inefficient in view of power consumption.

SUMMARY

The present disclosure is designed to solve the problems of the related art, and therefore the present disclosure is directed to providing an apparatus for driving an iris, which may allow a blade to maintain a given location just with a simple structure.

In one aspect of the present disclosure, there is provided an apparatus for driving an iris of a camera, comprising: first and second magnets provided at different locations; a blade having an opening through which light is introduced, the blade being configured to adjust the amount of light introduced to a lens by means of physical movement; a driving unit configured to perform the physical movement of the blade; and a blade yoke made of a magnetic material and provided to the blade to generate an attractive force to the first or second magnets according to a location of the blade.

Here, the first or second magnet of the present disclosure may be an autofocus (AF) magnet for AF operation of the lens or an optical image stabilization (OIS) magnet for OIS operation of the lens.

In addition, the blade of the present disclosure may rotate based on a rotary shaft located between the first and second magnets.

More preferably, the apparatus of the present disclosure may further comprise a support member configured to connect the rotary shaft and the blade, and in this case, the blade yoke may be provided to the support member.

Further, the blade yoke may have an asymmetric shape so that the attractive force generated from the first magnet corresponds to the attractive force generated from the second magnet.

In addition, the blade of the present disclosure may include a first blade configured to rotate based on a first rotary shaft; and a second blade coupled to the first blade by a link and configured to rotate based on a second rotary shaft in association with the rotational movement of the first blade, and in this case, the blade yoke may be provided to at least one of the first blade and the second blade.

Preferably, the driving unit of the present disclosure may rotate the first rotary shaft so that the first blade is rotated, and in this case, the blade yoke may be provided to the second blade.

In another aspect of the present disclosure, there is provided an apparatus for driving an iris of a camera, comprising: at least two magnets provided at different locations; a blade having an opening through which light is introduced, the blade being configured to adjust the amount of light introduced to a lens by means of physical movement; a driving unit configured to perform the physical movement of the blade; and a blade yoke made of a magnetic material and provided to the blade to generate an attractive force to the at least two magnets according to a location of the blade.

According to an embodiment of the present disclosure, since each blade may maintain a given location without any clearance or shaking by using the magnetic force between the blade yoke made of a magnetic material and provided to the blade and the magnet, the apparatus for driving an iris may be implemented more simply and improve the driving reliability further.

According to another embodiment of the present disclosure, since an AF magnet or an OIS magnet provided in a camera or a camera module may be utilized as a magnetic force generating unit as it is, the apparatus for driving an iris may be easily implemented in a camera module in which an AF function and/or an OIS function is implemented.

In addition, according to the present disclosure, it is possible to improve the service life of the apparatus since the blade may maintain a location by using the magnetic force of a permanent magnet and the blade yoke having magnetism, and it is also possible to implement the apparatus which ensures a low-power environment without generating noise in operation since a physical driving method using an elastic body or a gear is not used.

BRIEF DESCRIPTION OF DRAWINGS

FIG. 2A is a diagram for illustrating a process of opening or closing a blade according to an embodiment of the present disclosure.

FIG. 2B is another diagram illustrating a process of opening or closing a blade according to an embodiment of the present disclosure.

FIG. 3A is a diagram showing an operational relationship according to opening or closing of the blade according to an embodiment of the present disclosure.

FIG. 3B is another diagram showing an operational relationship according to opening or closing of the blade according to an embodiment of the present disclosure FIG. 4 is a diagram showing a relation between the blade yoke and the magnet of FIG. 3.

DETAILED DESCRIPTION

Figure 1:
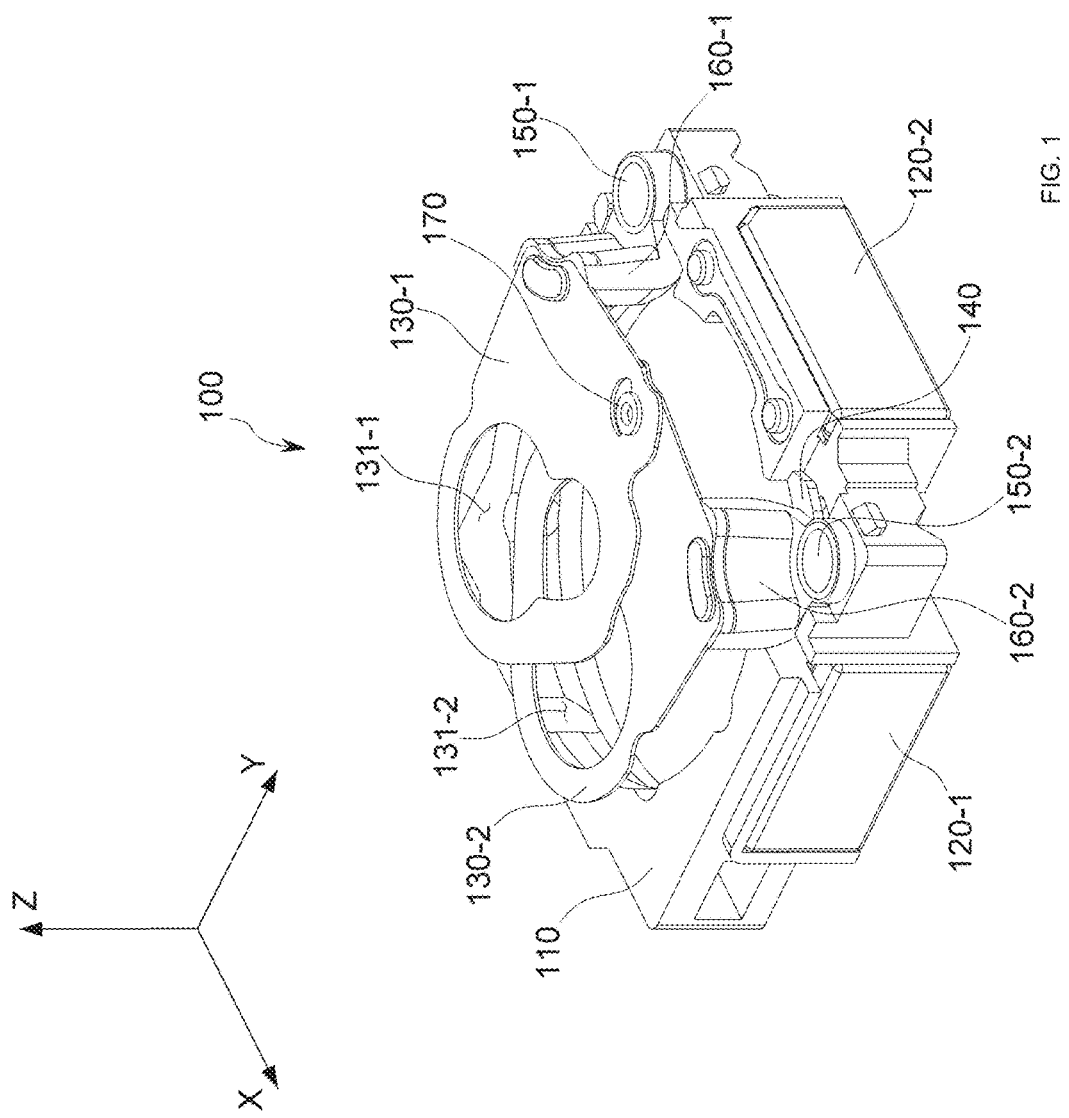
FIG. 1 is a diagram showing a structure of an apparatus for driving an iris according to an embodiment of the present disclosure.

FIG. 1 is a diagram showing a structure of an apparatus 100 for driving an iris (hereinafter, referred to as a 'driving apparatus') according to an embodiment of the present disclosure.

As shown in FIG. 1, the driving apparatus 100 according to an embodiment of the present disclosure may include a first magnet 120-1, a second magnet 120-2, blades 130, 130-1/130-2, a blade yoke 140, and a driving unit (not shown).

The driving apparatus 100 of the present disclosure may be implemented as an independent device or as an element mounted to a general camera device or a camera actuator (module). In particular, the driving apparatus 100 of the present disclosure may be mounted to a camera device in which an AF or OIS function is implemented solely or a camera device in which AF and OIS functions are implemented integrally.

The blade 130 of the present disclosure has openings 131-1, 131-2 through which light is introduced, and controls the amount of light that is input to the lens by physical movement. The blade may be implemented in a single number or may be implemented in two or more numbers as illustrated in the figure.

If two blades 130 are provided, the blades 130 are connected to each other by a link 170. Thus, if one blade (for example, the first blade 130-1) is moved, the other blade (for example, the second blade 130-2) is also moved.

The driving unit (not shown) of the present disclosure may be used to drive the physical movement of the blade 130 and may be implemented using a driving unit such as a motor or a structure for rotating a rotary shaft using a shape memory alloy (SMA) wire. In addition, in order to improve driving reliability and prevent noise generation, the blade 130 may be configured to be linearly or rotationally moved by using an electromagnetic force between a coil and a magnet.

Various embodiments may be applied at a level of those skilled in the art as long as the blade 130 is capable of being physically moved using the electromagnetic force between the coil and the magnet.

For this purpose, in an embodiment, a lever having a protruding shape is formed at rotary shafts 150-1, 150-2 of the blade 130, and the lever is connected to a driving magnet having a groove formed therein. Then, if the driving coil generates an attractive force and a repulsive force to the driving magnet, the driving magnet is linearly moved by this force, and the lever coupled to the groove of the driving magnet is rotated about the rotary shaft by the linear movement of the driving magnet.

As shown in FIG. 1, the first magnet 120-1 and the second magnet 120-2 of the present disclosure are provided at different locations. The first and second magnets 120-1, 120-2 function to generate an attractive force with the blade yoke 140, explained later.

The blade 130 described above is configured to control the amount of light that is input to the lens by physical movement (linear movement, rotational movement, or the like), and in the embodiment depicted in the figure, the blades 130-1, 130-2 are moved to a specific first or second location, so that the first and second blades 130-1, 130-2 may have a maximum opening and a minimum opening, respectively, depending on how much the openings 131-1, 131-2 overlap each other.

For example, if the blade 130 is moved to the first location by the driving unit (not shown), the maximum opening is achieved by the degree of overlapping of the openings 131-1, 131-2, and if the blade 130 is moved to the second location, instead of the first location, the minimum opening is achieved by the degree of overlapping of the openings 131-1, 131-2.

When the blade 130 is moved to a specific location such as the first location and the second location, the first magnet 120-1 and the second magnet 120-2 of the present disclosure allow the blade 130 to maintain at the position without moving, and the first magnet 120-1 and the second magnet 120-2 function to generate a magnetic force (an attractive force) to the blade yoke 140 provided at the blade 130.

Thus, the first magnet 120-1 and the second magnet 120-2 of the present disclosure may be provided at various locations as long as they may generate a magnetic force to the blade yoke 140 when the blade 130 is moved to the first or second location.

The blade yoke 140 of the present disclosure is provided at the blade 130 or a member supporting the blade 130 to generate an attractive force to the first magnet 120-1 or the second magnet 120-2 according to the location of the blade 130, and the blade yoke 140 is made of magnetic material.

When the blade 130 moves, the blade yoke 140 of the present disclosure may move together with the blade 130, and the blade yoke 140 may be implemented in various forms, for example as being provided at the blade 130 or being provided at a member supporting the blade 130, as long as the blade yoke 140 is capable of moving together with the blade 130.

If the driving apparatus 100 of the present disclosure is implemented at a camera device having an AF and/or OIS function, the driving apparatus 100 of the present disclosure may be provided on a frame 110 that accommodates a configuration for the AF or OIS function, and the driving apparatus 100 may be protruded forwards (in a Z-axis direction that is an optical-axis direction in FIG. 1) as depicted in the figure so as not to generate physical interference with the lens or other components.

Since the blade yoke 140 of the present disclosure is made of magnetic material, the blade yoke 140 is influenced by the attractive force respectively provided by the first magnet 120-1 and the second magnet 120-2 at different locations. In the present disclosure, the attractive force is used to maintain the location of the blade 130 having the blade yoke 140.

The magnetic force between the first and second magnets 120-1, 120-2 and the blade yoke 140 may be smaller than the driving force of the driving unit so that the location of the blade 130 is maintained by the magnetic force (the attractive force) and simultaneously the blade 130 is driven effectively driven. In addition, the magnetic force between the first and second magnets 120-1, 120-2 and the blade yoke 140 may be larger than the force corresponding to the load of the blade 130 or the load of the blade 100 and other members moving together with the blade 130.

Meanwhile, the AF operation is performed by using the magnetic force between the magnet and the coil, and the OIS operation is also implemented by using the magnetic force between the magnet and the coil. Thus, in case of a camera device having the AF and/or OIS function, an AF magnet and an OIS magnet for moving a carrier having the lens in an optical-axis direction (a Z-axis direction) or a direction (an X-axis direction and a Y-axis direction) perpendicular to the optical axis is provided at a side or bottom at each direction corresponding to the X axis and the Y axis.

Thus, the first magnet 120-1 and the second magnet 120-2 of the present disclosure may be separate magnets just for generating a magnetic force with the blade yoke 140, or the first magnet 120-1 and the second magnet 120-2 may utilize the AF magnet or the OIS magnet that is already provided at the frame 110 for the AF and/or OIS function.

For example, both the first magnet 120-1 and the second magnet 120-2 may be OIS magnets for the OIS operation, or the first magnet 120-1 is an AF magnet for the AF operation and the second magnet 120-2 is an OIS magnet for the OIS operation.

According to an embodiment, an additional magnet for generating an attractive force with one of the AF magnet and the OIS magnet may also be used as the first magnet 120-1 and the second magnet 120-2.

If the AF magnet or the OIS magnet is used as the first magnet 120-1 or the second magnet 120-2, though not shown in the drawing, a coil for the AF operation or the OIS operation is disposed at a portion facing the first magnet 120-1 and the second magnet 120-2.

Meanwhile, the blade 130 of the present disclosure may be implemented to rotate based on rotary shafts 150-2, 160-2 located between the first magnet 120-1 and the second magnet 120-2.

In this case, if two blades 130 are provided according to an embodiment, the first blade 130-1 may be configured to rotate based on the first rotary shaft 150-1, and the second blade 130-2 may be configured to rotate based on the second rotary shaft 150-2.

Here, the driving unit (not shown) may be connected to at least one of the first rotary shaft 150-1 or the second rotary shaft 150-2 so that the first blade 130-1 and the second blade 130-2 may rotate based on the first rotary shaft 150-1 or the second rotary shaft 150-2.

In addition, according to an embodiment, the driving unit (not shown) may be connected only to the first rotary shaft 150-1 so that the rotating driving force is transmitted to the first blade 130-1, and the second blade 130-2 may be rotated in a direction opposite to the rotating direction of the first blade 130-1 in association with the rotational movement of the first blade 130-1, by means of the link 170 connected between the first blade 130-1 and the second blade.

In this case, the blade yoke 140 may be provided at both the first blade 130-1 and the second blade 130-2, but it is preferable that the blade yoke 140 be provided at the second blade 130-2 to which a driving force is not directly transmitted, in order to increase the driving efficiency.

The driving apparatus of the present disclosure may be implemented so that the blade is linearly moved according to the embodiment and the lens is adjusted differentially depending on the degree of movement of the blade. In this case, the first magnet 120-1 and the second magnet 120-2 of the present disclosure are provided at locations respectively corresponding to the first location and the second location obtained by the linear movement of the blade 130.

Since the first blade 130-1 and the second blade 130-2 are generally provided in a thin film form, a physical member connecting the rotary shafts 150-1, 150-2 and the blade 130-1 may be provided so that the blade 130 is physically supported more effectively and is also rotated more flexibly, rather than rotating the blades 130-1, 130-2 directly.

For example, the first blade 130-1 may be connected to the first rotary shaft 150-1 by a first support member 160-1 and the second blade 130-2 may be connected by the second rotary shaft 150-2 by a second support member 160-2. In addition, the blade 130 may be configured to protrude in the optical-axis direction using the height of the support members 160-1, 160-2.

In this case, the blade yoke 140 made of a magnetic material may be directly provided at the blade 130. However, in order to further improve the reliability of the operating relationship, the blade yoke 140 of the present disclosure as described above may be provided at the first support member 160-1 or the second support member 160-2.

If the first blade 130-1 is configured to rotate by the driving unit and the second blade 130-2 is configured to rotationally move depending on the rotational movement of the first blade 130-1 as described above, it is preferred that the blade yoke 140 is provided at the second support member 160-2.

FIG. 2 is a diagram for illustrating a process of opening or closing the blades 130-1, 130-2 according to an embodiment of the present disclosure, and FIG. 3 is a diagram showing an operational relationship according to opening or closing of the blades 130-1, 130-2 according to an embodiment of the present disclosure. FIG. 3 is a perspective view showing a partial configuration of the driving apparatus 100 according to the present disclosure, depicted in FIG. 2, observed from the below.

FIGS. 2(*a*) and 3(*a*) show that both the first blade 130-1 and the second blade 130-2 are positioned at the first location (an initially set location), and FIGS. 2(*b*) and 3(*b*) show that the first blade 130-1 and the second blade 130-2 are rotated by the driving unit (not shown) to be positioned at a second location.

The embodiment depicted in FIGS. 2 and 3 is an example implementing the technical idea of the present disclosure. In this embodiment, the driving force of the driving unit (not shown) is transmitted only to the first rotary shaft 150-1, and if the first rotary shaft 150-1 is rotated by the driving unit (not shown), the first blade 130-1 rotates by means of the first support member 160-1.

In addition, in this embodiment, the blade yoke 140 is provided at the second support member 160-2 connected to the second blade 130-2 for the efficiency of operation relation as described above.

As shown in FIGS. 2(*a*) and 3(*a*), if the first blade 130-1 and the second blade 130-2 are at the first location (the initial set location), the openings 131-1, 131-2 are spaced relatively far from each other, thereby forming an opening of a small diameter (R1 in FIG. 3).

In this case, the blade yoke 140 of the present disclosure physically approaches the first magnet 120-1 and is pulled by an attractive force with the first magnet 120-1, thereby maintaining the location of the first blade 130-1. Even though the first magnet 120-1 is influenced by the attractive force with the first magnet 120-1, it is possible that the first blade 130-1 is restricted not to physically move due to the attractive force by means of a physical stopper or the like.

In this state, if the driving unit (not shown) is driven to rotate, the driving force is transmitted to the first rotary shaft 150-1, and as the first rotary shaft 150-1 rotates, the first blade 130-1 is rotated in a counterclockwise direction (based on FIG. 2, or in a clockwise direction based on FIG. 3), and accordingly the first opening 131-1 is rotated in the counterclockwise direction (based on FIG. 2).

If the first blade 130-1 is rotated, the second blade 130-2 connected to the first rotary blade 130-1 by the link 170 and axially coupled to the second rotary shaft 150-2 is rotated in a clockwise direction (based on FIG. 2) in association with the rotational movement of the first blade 130-1, and accordingly the second opening 131-2 formed in the second blade 130-2 is also rotated in the clockwise direction (based on FIG. 2).

By means of the rotational movement, the first opening 131-1 and the second opening 131-2 become relatively closer to each other, thereby forming an opening of a larger diameter opening (R2 in FIG. 3). By changing the size of the opening by rotating the blade 130, the amount of light input to the lens is differentially controlled.

Meanwhile, the blade yoke 140 of the present disclosure is provided at the second support member 160-2 connected between the second blade 130-2 and the second rotary shaft 150-2. Here, as the second blade 130-2 is rotated in the clockwise direction (FIG. 2), the blade yoke 140 also rotates in the clockwise direction (based on FIG. 2).

If the blade yoke 140 is rotated in the clockwise direction (based on FIG. 2) as described above, the blade yoke 140 physically approaches the second magnet 120-2 and accordingly receives the magnetic force (the attractive force) of the second magnet 120-2 relatively more. Thus, the position of the blade yoke 140 is maintained by the attractive force of the second magnet 120-2, and accordingly the location of the second blade 130-2 having the blade yoke 140 is maintained.

FIGS. 2 and 3 corresponds to an embodiment in which a small opening is formed when the blade 130 is at a reference location (the first location) and a large opening is formed when the blade 130 moves to a second location different from the first location. However, it is also possible that a relatively large opening is formed at the reference location (the first location) and a relatively small opening is formed at the second location, contrary to the above.

FIG. 4 is a diagram showing a relation between the blade yoke 140 and the magnets 120-1, 120-2 of FIG. 3.

As shown in FIG. 4, the blade yoke 140 of the present disclosure changes its location from the first location to the second location or from the second location to the first location by the rotation movement, and receives a relatively great attractive force by the magnet 120-1, 120-2 which is close to each location.

In other words, if the blade yoke 140 is close to the first magnet 120-1, one end portion (a) of the blade 130 moves close to the first magnet 120-1, and the other end portion (b) moves away from the second magnet 120-2.

Thus, the blade yoke 140 is more influenced by the attractive force of the first magnet 120-1 in comparison to the attractive force of the second magnet 120-2, and thus the blade 130 having the blade yoke 140 maintains its location by the attractive force.

In a corresponding point of view, if the blade yoke 140 rotates in the counterclockwise direction (based on FIG. 4), one end portion (a) of the blade yoke 140 moves away from the first magnet 120-1, and the other end portion (b) of the blade yoke 140 moves close to the second magnet 120-2. Thus, due to this location change, the blade 130 receives the attractive force by the second magnet 120-2 more greatly, and thus the blade 130 having the blade yoke 140 maintains its location by the attractive force of the second magnet 120-2.

The blade yoke 140 may be implemented to have an asymmetric shape or a waved shape as shown in FIG. 4 in consideration of the distance between the first magnet 120-1 and the second magnet 120-2, so that the attractive forces generated with the first magnet 120-1 and the second magnet 120-2 may correspond to each other.

| Reference Signs | |
|---|---|
| 100: apparatus for driving an iris | |
| 110: frame | |
| 120-1: first magnet | 120-2: second magnet |
| 130-1: first blade | 130-2: second blade |
| 131-1: first opening | 131-2: second opening |
| 140: blade yoke | |
| 150-1: first rotary shaft | 150-2: second rotary shaft |
| 160-1: first support member | 160-2: second support member |
| 170: link | |

What is claimed is:

1. An apparatus for driving a blade of a camera, comprising:
    a blade including a first blade configured to rotate based on a first rotary shaft and a second blade coupled to the first blade by a link and configured to rotate based on a second rotary shaft in association with the rotational movement of the first blade, wherein the blade has an opening through which light is introduced and is configured to adjust the amount of light introduced to a lens by means of physical movement;
    first and second magnets provided at different fixed locations and be spaced from the blade;
    a driving unit configured to rotate the first rotary shaft so that the first blade is rotated;
    a first support member connecting the first blade and the first rotary shaft;
    a second support member connecting the second blade and the second rotary shaft; and
    a blade yoke made of a magnetic material and provided to at least one of the first support member or the second member to generate an attractive force to the first or second magnets according to a location of the blade.

2. The apparatus for driving a blade of a camera according to claim 1,
    wherein the first or second magnet is an autofocus (AF) magnet for AF operation of the lens or an optical image stabilization (OIS) magnet for OIS operation of the lens.

3. The apparatus for driving a blade of a camera according to claim 1,
    wherein the blade yoke has an asymmetric shape so that the attractive force generated from the first magnet corresponds to the attractive force generated from the second magnet.

* * * * *